United States Patent [19]

KaDell, Jr.

[11] Patent Number: 4,545,570

[45] Date of Patent: Oct. 8, 1985

[54] GIMBAL FIXTURE AND ASSEMBLY METHOD

[75] Inventor: Charles W. KaDell, Jr., Fullerton, Calif.

[73] Assignee: General Dynamics/Pomona Division, Pomona, Calif.

[21] Appl. No.: 686,612

[22] Filed: Dec. 24, 1984

Related U.S. Application Data

[60] Continuation of Ser. No. 526,698, Aug. 26, 1983, abandoned, which is a division of Ser. No. 383,373, May 28, 1982, Pat. No. 4,542,654.

[51] Int. Cl.$^4$ .............................................. B23Q 1/00
[52] U.S. Cl. .................................... 269/52; 269/296; 269/902
[58] Field of Search ................. 269/47, 52, 296, 303, 269/902; 82/45; 248/356; 206/303

[56] References Cited

FOREIGN PATENT DOCUMENTS 739610 9/1943 Fed. Rep. of Germany ...... 269/296
663532 5/1979 U.S.S.R. .............................. 269/296

*Primary Examiner*—Frederick R. Schmidt
*Assistant Examiner*—Judy J. Hartman
*Attorney, Agent, or Firm*—Neil F. Martin; Calif K. Tervo; Edward B. Johnson

[57] ABSTRACT

A highly accurate rapid gimbal assembly method utilizes two fixtures for establishing the critical gimbal assembly parameters of yield and axis of intersection and an adhesive for bonding each mating surface of the gimbal assembly for holding the components of the gimbal assembly in their adjusted positions. The fixtures include an inner/outer gimbal fixture for holding the inner and outer gimbals in relative position for bonding and a gimbal/post fixture for holding the gimbal assembly in alignment on the support post for bonding. These fixtures and assembly method eliminate the need for use of shims between the mating surfaces for establishing alignment of the critical parameters.

11 Claims, 9 Drawing Figures

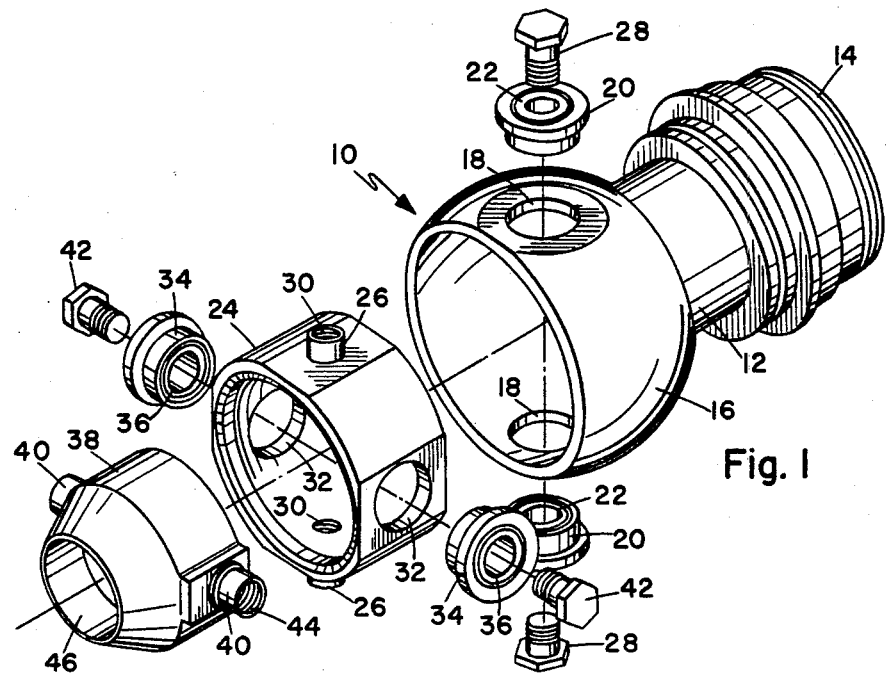
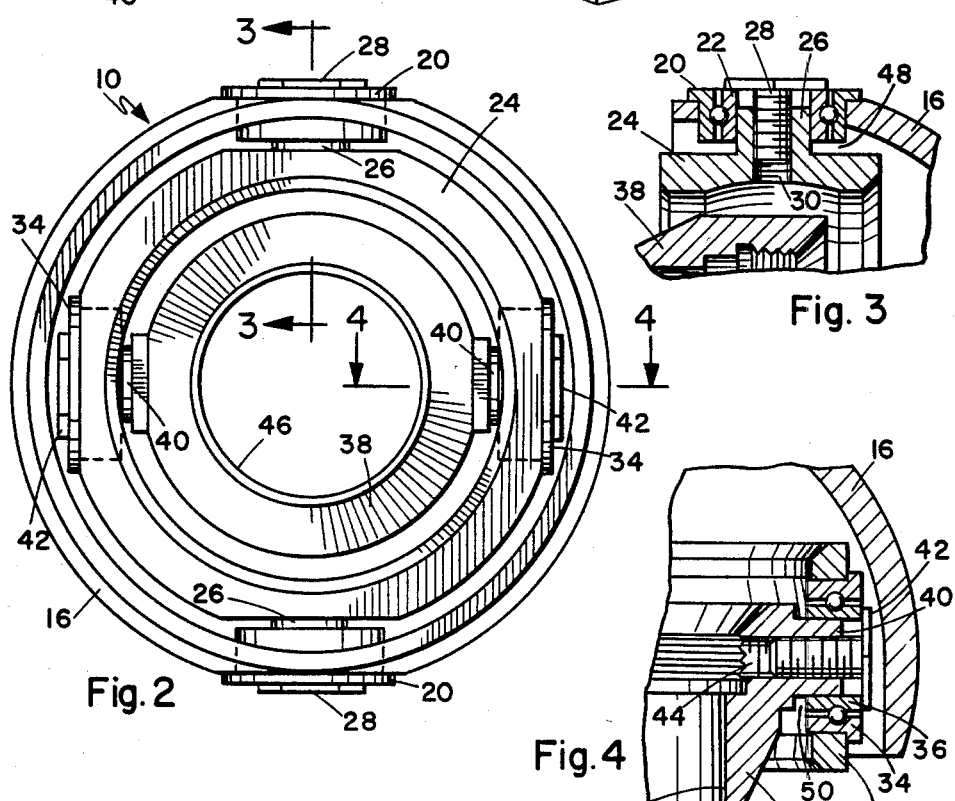

GIMBAL FIXTURE AND ASSEMBLY METHOD

The government has rights in this invention pursuant to Contract No. DAAK40-77-C-0122, awarded by the U.S. Army.

This is a file wrapper continuation of application Ser. No. 526,698, filed Aug. 26, 1983 now abandoned, which is a division of application Ser. No. 383,373, filed May 28, 1982 now U.S. Pat. No. 4,542,654 of which claims, as amended, have been allowed.

BACKGROUND OF THE INVENTION

The present invention relates to gyroscopic gimbal assemblies and pertains particularly to methods and apparatus for assembling gimbals.

Conventional production factory assembly of a typical two axis gimbal involves a highly repetitive assembly procedure that takes in excess of two hours. This method is not only extremely time consuming but produces a less than superior assembly. The standard procedure of assembly utilizes a selection fit and the use of a plurality of shims for making relative adjustments in the interdependent parameters of the gimbal assembly.

The axis of intersection of the spin bearing bore and outer gimbal bearing must intersect within 0.0004 TIR to minimize gyro drift due to missile acceleration. The spin bearing bore must also be coincident with the gimbal post bore longitudinal axis within 0.0008 TIR to ensure proper gyro-optics/detector alignment. These alignments of the axes of coincidence and intersection are achieved in a conventional assembly technique by shimming the inner and outer gimbal rings into position.

Another parameter which must be adjusted during assembly is yield, which refers to the magnitude of gimbal compliance along each of the two orthogonal gimbal axes and is measured in microinches of deflection per pound of applied load. A gimbal yield of about 100 microinches per inch pound will result in a gimbal assembly with no free play and smooth gimbal motion under an applied torque. Shims are added or subtracted from beneath the gimbal bearings inner races to increase or decrease the bearing load when the gimbal screw torque is applied to preload the bearing.

Ideally, shims should be removed or added equally to both sides of the gimbal ring during this process, thereby adjusting yield but not axis of intersection. This is not possible because of shim width and flatness tolerances, which results in an interactive assembly process which trades axis of intersection for yield until an acceptable value of each is obtained. This assembly process is extremely time consuming requiring from two to four hours per gimbal assembly.

It is therefore desirable to have an assembly technique which will reduce gimbal assembly time and obtain more reliable accurate parameter adjustment.

SUMMARY AND OBJECTS OF THE INVENTION

It is therefore the primary object of the present invention to provide an improved gimbal assembly method and apparatus.

In accordance with the primary aspect of the present invention, first and second fixtures are utilized for establishing the critical gimbal assembly parameters of yield and axis intersection without the use of gimbal shims with a high strength adhesive applied to and bonding each mating surface, and gimbal preload or yield is set simultaneous with alignment of the axis of intersection before the adhesive is solidified.

BRIEF DESCRIPTION OF THE DRAWINGS

The above and other objects and advantages of the present invention will become apparent from the following description when read in conjunction with the drawings wherein:

FIG. 1 is an exploded perspective view of a typical gimbal unit adaptable to the normal assembly technique;

FIG. 2 is an enlarged front end view of the assembled gimbal unit;

FIG. 3 is a sectional view taken on line 3—3 of FIG. 2;

FIG. 4 is a sectional view taken on line 4—4 of FIG. 2;

DETAILED DESCRIPTION OF A PREFERRED EMBODIMENT

Figure 5:
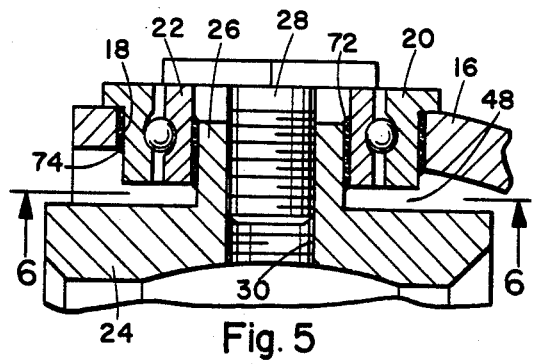
FIG. 5 is an enlarged view similar to a portion of FIG. 3 showing the adhesive layers greatly exaggerated.

Turning to the drawings, particularly FIG. 1, there is illustrated a typical gimbal assembly, designated generally by the numeral 10, for which the present assembly fixtures and method may be readily applied. The gimbal assembly comprises a support post 12 having a base with attachment means such as a threaded section 14 for attachment to support structure such as the structure of an air frame. The support post includes a generally bell-like housing portion 16 having aligned trunnion bearing support bores 18 in which trunnion support bearings, including an outer race 20 and an inner race 22, are mounted.

An outer gimbal ring 24 includes trunnions 26 which fit within the bore of the inner races 22 for supporting the outer gimbal ring within the housing 16. A pair of tension bolts 28 engage threaded bores 30 of the gimbal trunnions 26 for preloading the gimbal bearings. This preload is accomplished by biasing the inner race of the bearing relative to the outer race, placing a load on the balls between the races.

The outer gimbal ring 24 includes aligned bearing mounting bores 32 which are disposed at right angles to the axis of the trunnions 26 for receiving trunnion support bearings, including outer races 34 and inner races 36, for supporting the inner gimbal ring 38.

The inner gimbal ring 38 includes opposed axially aligned trunnions 40 which mount within the bores of the inner races 36 of the trunnion support bearings for mounting the inner support gimbal ring within the outer ring. A pair of tension bolts 42 engage threaded bores 44 within the trunnions 40 of the inner gimbal for tensioning or preloading the gimbal bearings. The inner ring 38 further includes a spin bearing bore 46 which must precisely intersect the gimbal support axes with an intersection tolerance of 0.0004 TIR. The bore must also be actually aligned with the gimbal post bore longitudinal axis within 0.0008 TIR in order to ensure proper detector alignment. The conventional technique for assembling and aligning the axes of the gimbal assembly is by the use of shims. These shims would be placed in the space designated generally by the numeral 48 in FIGS. 3 and 5 between the inner race and the gimbal ring and between or within the space designated by the numeral 50 in FIG. 4 between the inner race and the gimbal ring 38. The present method, as will be described, eliminates the need for such shims and may be generally referred to as a shimless gimbal assembly.

The alignment of the axes is accomplished in the present assembly technique by means of a pair of novel fixtures which align and maintain alignment of the respective axes while the coacting relatively fixed members of the gimbal assembly are bonded together by a high strength adhesive.

Figure 7:
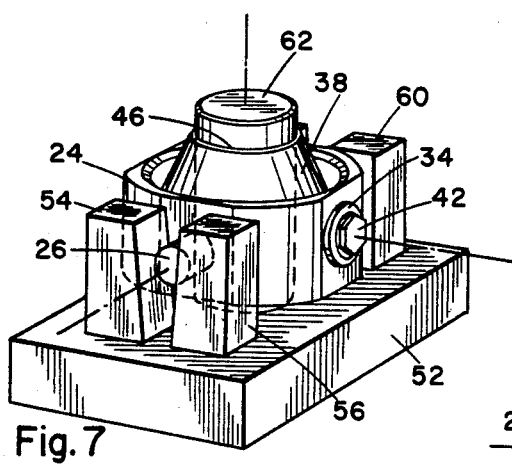
FIG. 7 is a perspective view of the inner to outer gimbal assembly fixture.
Figure 8:
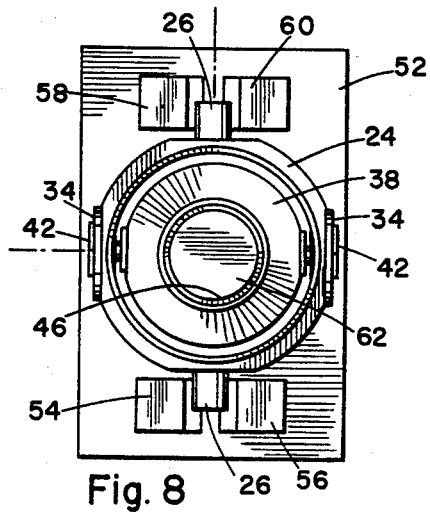
FIG. 8 is top plan view of the fixture of FIG. 7.

The first assembly fixture mates the inner gimbal spin bearing mount 38 to the outer gimbal ring 24 as shown in FIGS. 7 and 8. This fixture includes a base member or portion 52 with a pair of posts 54 and 56 having slanted opposed surfaces forming a V-groove therebetween on one end of the base member 52. A similar pair of posts 58 and 60 having similar slanted opposed faces forming a V-groove are disposed on the opposite end of the base member 52.

In using the fixture in the method of assembly, a suitable high strength adhesive, such as a Dimethacrylate resin sold under the mark "LOCTITE 601", is applied to the inner gimbal trunnions, bearing bores, outside diameters and bearing housing bores and these are then assembled to the outer gimbal ring in a conventional manner. This assembly is then placed in the fixture such that the outer gimbal trunnions 26 rest within the V-grooves formed by the opposed slanted faces of the tapered posts 54 through 60.

A spin bearing bore alignment shaft 62 is secured to the center of the base member 52 projecting upward therefrom for engaging and aligning the spin bearing bore. The center line of this shaft 62 is designed to intersect the center line of the tapered blocks within 50 microinches TIR, thus the inner axis of intersection tolerances of 0.0004 TIR of the gimbal axis and spin bearing bore can be achieved.

After the assembly has been placed within the fixture, as described, the gimbal screws are then torqued to a predetermined value which optimizes bearing preload and gimbal operation and the adhesive allowed to set up. A torque value of 0.25 inches per ounce has been found to be satisfactory for certain gimbals during engineering testing.

The adhesive is now applied to the outer gimbal trunnions, bearing, bores, outside diameters and post bearing housing bores and this gimbal ring assembly is then mated with the gimbal support post. The gimbal assembly is then inserted into the gimbal support post, such that the gimbal diameter plane is 180° from its orientation during assembly. This orientation reduces gimbal axis shift due to decentering of the trunnions and bearing outside diameters during the assembly process.

Figure 9:
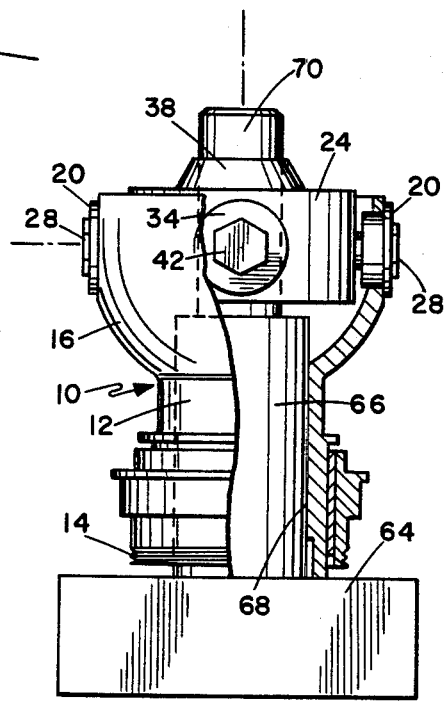
FIG. 9 is a side elevation view, with portions cutaway, of the gimbal to post assembly fixture.

A second fixture, as shown in FIG. 9 is used to center the spin bearing bore axis and align it with the gimbal post bore. The second fixture includes a base member 64 having a shaft secured to and extending vertically therefrom, with the shaft having a first diameter portion 66 adapted to fit and mate with the gimbal support post bore 68. A second diameter portion of the shaft 70 is adapted to mate with and align the spin bearing bore 46 with the bore 68 of the gimbal post.

The center shaft on the second fixture contains two coincident diameters, the post-detector/cyrostat bore diameter 66 and the gimbal spin bearing bore diameter 70. The coincidence of these diameters sets the outer axis of intersection within the specified limits. The outer gimbal screws are then torqued to the same level as the inner gimbal screws. This completes the gimbal assembly and the adhesive is permitted to set. The adhesive may be either air or oven cured. Evaluation tests using a 24 hour air cure and a primer during assembly achieved satisfactory results.

This assembly has been completed in as little as 10 minutes as opposed to the conventional method of assembly, which typically takes from 2 to 4 hours. This gimbal assembly technique and apparatus results in a significant reduction in assembly time, and the use of gimbal shims is also eliminated.

The shims are not only an additional piece of hardware that must be selectively added and taken away from the assembly, they are also detrimental to maximizing gimbal yield or compliance. The use of shims results in a gimbal yield of about 100 microinches inch per pound. A gimbal yield of less than this figure, say below 80 microinch pounds, results in assembly which does not move freely due to high frictional resistance in the gimbal bearings.

Eliminating the shims, as in the present assembly, allows gimbal to decrease to about 40 microinch pounds. The decrease in yield when shims are used are possibly attributable to shim taper, such that as a load or preload as applied to the inner race, the race will deflect until it contacts the high point of the shim. Any further significant deflection increases frictional resistance between the bearing race and ball in that section of the bearing thereby inhibiting smooth bearing operation.

Since yield is the reciprocal of spring rate, the gimbals become stiffer without the use of shims. This stiff, less compliant gimbal, is desirable since this reduces the tendency for the bearing to unload during an inflight missile acceleration maneuver.

The conventional technique of assembly and tolerance on gimbal bearing bores and trunnions require a selective fit assembly process. This selective fit method is used to minimize the trunnion and bore to bearing clearances.

Figure 6:
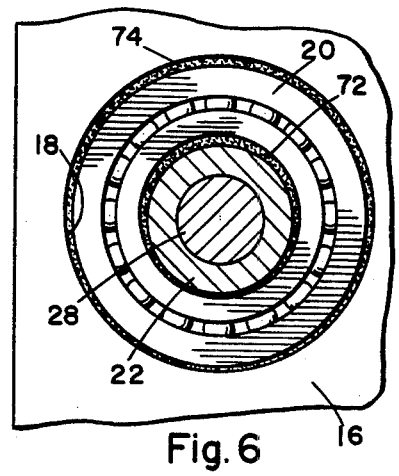
FIG. 6 is a sectional view taken on line 6—6 of FIG. 5.

The selected fit method is not necessary, or even desirable, when the assembly technique of the present invention is used. In fact, larger tolerances are desirable because the bonding adhesive fills the annular gap between the trunnion and inner race bore and the outer race and the bearing mount bores, as shown in FIGS. 5 and 6. More particularly, an adhesive layer 72 fills the space between the inner race 22 and the outer race 20 and a layer 74 of the adhesive fills the space between the outer race 20 and the walls of the bore 18.

As mentioned above, the preferred bonding agent is an anaerobic resin such as dimethacrylate which is available under the Trademark "LOCTITE 601".

The tension bolts 28 and 42 can also be eliminated and the preload achieved such as by means of a press or similar means (not shown). When such tension bolts are used in the assembly, they will also be secured or bonded in place by an adhesive such as "LOCTITE 601" adhesive.

While I have illustrated and described my invention by means of specific embodiments, it is to be understood that numerous changes and modification may be made therein without departing from the spirit and scope of the invention as defined in the appended claims.

I claim:

1. A gimbal assembly fixture for aligning an axis of a gimbal relative to a support member; the combination comprisng:
   a gimbal;
   a gimbal support member;
   a base member;
   first engaging means on said base member for engaging and maintaining said gimbal support member in a predetermined position; and
   second engaging means connected to said base member for engaging and maintaining said gimbal in a predetermined aligned position with respect to said gimbal support member.

2. The combination of claim 1 wherein:
   said gimbal support member is an outer gimbal ring having trunnions defining a trunnion axis;
   said first engaging means comprises means for engaging and supporting said trunnions;
   said gimbal has an inner bore; and
   said second engaging means comprises a shaft for engaging and maintaining said inner bore in said inner gimbal in an aligned position with respect to said trunnion axis of said outer gimbal ring.

3. The combination of claim 2 wherein:
   said trunnion engaging and supporting means comprises means defining a pair of spaced apart support grooves.

4. The combination of claim 3 wherein:
   said trunnion engaging and supporting means comprises a pair of spaced apart tapered blocks, each pair having opposed slanting faces defining said spaced apart support grooves.

5. The combination of claim 4 wherein:
   said shaft of said second engaging means comprises a vertical, cylindrical shaft mounted on said base member between said pairs of support blocks; the center line of said shaft designed to intersect a centerline between said support grooves.

6. The combination of claim 1 wherein:
   said gimbal support member is a support post having an inner bore;
   said first engaging means is a first diameter portion of a cylindrical shaft for engaging said inner bore of said support post;
   said gimbal has an inner bore; and
   said second engaging means comprises a second diameter portion of said shaft for engaging and aligning said inner bore of said gimbal with said inner bore of said support posts.

7. A gimbal alignment fixture for aligning an axis of a gimbal relative to a support member; the combination during assembly of said gimbal with said support member comprising:
   a gimbal;
   a gimbal support member;
   a base member;
   first engaging means mounted on said base for engaging and maintaining said gimbal support member in a predetermined position; and
   second engaging means connected to said base for engaging and maintaining said gimbal in a predetermined aligned position with respect to said gimbal support member.

8. The combination of claim 7 wherein:
   said gimbal support member is an outer gimbal ring, said ring having trunnions defining a trunnion axis;
   said first engaging means comprises means for engaging and supporting said trunnions;
   said gimbal has an inner spin axis bore; and said second engaging means comprises a cylindrical shaft mounted on said base member between said trunnion support means for engaging and maintaining said spin axis bore of said inner gimbal in an aligned position with respect to said trunnion axis of said outer gimbal ring.

9. The combination of claim 8 wherein:
   said trunnion support means comprises a pair of spaced apart tapered blocks, each pair having opposed slanting faces defining a support groove for supporting a trunnion; and
   the centerline of said shaft intersects a centerline between the support grooves.

10. The combination of claim 7 wherein:
    said gimbal support member is a support post having an inner bore; and
    said first engaging means is a first diameter portion of a cylindrical shaft for engaging said inner bore of said support post; and
    said gimbal has an inner bore; and
    said second engaging means comprises a second diameter portion of said shaft for engaging and aligning said inner bore of said gimbal with said inner bore of said support post.

11. A combination of a gimbal and gimbal alignment fixtures for successively aligning the axes of the gimbals of a multi-axis, multi-gimbal structure relative to their respective support structure during assembly; the combination comprising:
    an inner gimbal having an inner spin axis bearing bore; an outer gimbal ring for supporting said inner gimbal; said outer gimbal ring having trunnions defining a trunnion axis; a support post for supporting said outer gimbal ring; said support post having an inner bore;
    a first fixture including:
       a base member;
       means for defining a pair of spaced apart support grooves; said groove means mounted on said base member for engaging and supporting said trunnions of said outer gimbal ring;
       a vertical shaft on said base member for engaging and supporting a spin axis bearing bore in an inner gimbal in an aligned position with respect to said outer gimbal; and
    a second fixture including:
       a step diameter cylindrical shaft having a first diameter portion for engaging said inner bore of said gimbal support post and a second diameter portion for engaging said inner bore of said inner gimbal for engaging and aligning said inner bore of said inner gimbal with respect to said inner bore of said support post.

* * * * *